(12) United States Patent
Chandola et al.

(10) Patent No.: US 9,819,689 B2
(45) Date of Patent: Nov. 14, 2017

(54) LARGE SCALE MALICIOUS PROCESS DETECTION

(71) Applicant: Microsoft Technology Licensing, LLC, Redmond, WA (US)

(72) Inventors: Himanshu Chandola, Bellevue, WA (US); Jack Wilson Stokes, III, North Bend, WA (US); Gil Lapid Shafriri, Redmond, WA (US); Craig Henry Wittenberg, Clyde Hill, WA (US); Timothy W. Burrell, Prestury (GB); Christian Seifert, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 14/657,215

(22) Filed: Mar. 13, 2015

(65) Prior Publication Data

US 2016/0269424 A1     Sep. 15, 2016

(51) Int. Cl.
| | |
|---|---|
| *G06F 21/00* | (2013.01) |
| *H04L 29/06* | (2006.01) |
| *G06F 17/30* | (2006.01) |
| *G06F 21/55* | (2013.01) |

(52) U.S. Cl.
CPC ...... *H04L 63/1416* (2013.01); *G06F 17/3053* (2013.01); *G06F 17/30477* (2013.01); *G06F 21/552* (2013.01)

(58) Field of Classification Search
USPC ........................................................ 706/52
See application file for complete search history.

(56) References Cited

U.S. PATENT DOCUMENTS

| | | | | |
|---|---|---|---|---|
| 6,289,342 | B1 * | 9/2001 | Lawrence | G06F 17/30728 |
| 7,587,760 | B1 * | 9/2009 | Day | H04L 63/12 |
| | | | | 709/223 |
| 7,707,634 | B2 * | 4/2010 | Sandu | G06F 21/562 |
| | | | | 726/22 |
| 7,712,132 | B1 | 5/2010 | Ogilvie | |
| 7,743,418 | B2 * | 6/2010 | Clift | G06F 21/56 |
| | | | | 726/22 |
| 8,176,555 | B1 | 5/2012 | Schreiner et al. | |
| 8,621,233 | B1 | 12/2013 | Manadhata et al. | |

(Continued)

OTHER PUBLICATIONS

Saxe, Joshua, "A Scalable, Ensemble Approach for Building and Visualizing CodeSharing Networks over Millions of Malicious Binaries", Retrieved on: Dec. 30, 2014, Available at: https://www.blackhat.com/docs/us-14/materials/us-14-Saxe.pdf.

(Continued)

*Primary Examiner* — Maung Lwin
(74) *Attorney, Agent, or Firm* — Workman Nydegger

(57) ABSTRACT

Identify a set or session of processes as having certain characteristics. A method obtains a known set or session of processes, wherein the known set or session of processes has the certain characteristics. A set or session of processes to be evaluated is obtained. A weighted similarity measure is performed between the known set or session of processes and the set or session of processes to be evaluated. The weighted similarity measure is performed element wise, where a comparison is performed for each defined element in the set or session of processes to be evaluated against elements in the known set or session of processes.

21 Claims, 5 Drawing Sheets

(56) References Cited

U.S. PATENT DOCUMENTS

| | | | |
|---|---|---|---|
| 8,763,127 B2 | 6/2014 | Yao et al. | |
| 8,850,581 B2 | 9/2014 | Wang et al. | |
| 9,306,962 B1* | 4/2016 | Pinto | H04L 63/1416 |
| 2002/0174358 A1* | 11/2002 | Wolff | G06F 21/554 |
| | | | 726/24 |
| 2004/0039933 A1* | 2/2004 | Martin | G06F 17/30011 |
| | | | 726/13 |
| 2006/0294592 A1* | 12/2006 | Polyakov | G06F 21/566 |
| | | | 726/24 |
| 2008/0313128 A1* | 12/2008 | Arasu | G06F 17/30312 |
| 2009/0210406 A1* | 8/2009 | Freire | G06F 17/30705 |
| 2009/0276851 A1* | 11/2009 | Smith | H04L 63/1441 |
| | | | 726/23 |
| 2010/0269178 A1* | 10/2010 | Ogilvie | G06F 21/55 |
| | | | 726/23 |
| 2011/0283361 A1 | 11/2011 | Perdisci et al. | |
| 2012/0151586 A1* | 6/2012 | Hentunen | G06F 21/563 |
| | | | 726/24 |
| 2013/0191915 A1 | 7/2013 | Antonakakis et al. | |
| 2014/0068768 A1 | 3/2014 | Lospinuso et al. | |
| 2014/0189864 A1 | 7/2014 | Wang et al. | |
| 2014/0373148 A1 | 12/2014 | Nelms et al. | |
| 2015/0007319 A1 | 1/2015 | Antonov et al. | |
| 2015/0096027 A1* | 4/2015 | Romanenko | G06F 21/56 |
| | | | 726/23 |
| 2015/0161237 A1* | 6/2015 | Agarwal | G06Q 10/10 |
| | | | 707/749 |

OTHER PUBLICATIONS

Saxe, et al., "Visualization of Shared System Call Sequence Relationships in Large Malware Corpora", In Proceedings of the Ninth International Symposium on Visualization for Cyber Security, Oct. 15, 2012, pp. 33-40.

Hassana, et al., "A Similarity-Based Machine Learning Approach for Detecting Adversarial Android Malware", In Technical Report, Nov. 6, 2014, 23 pages.

Hegedus, et al., "Methodology for Behavioral-based Malware Analysis and Detection using Random Projections and K-Nearest Neighbors Classifiers", In Proceedings of Seventh International Conference on Computational Intelligence and Security, Dec. 3, 2011, 8 pages.

Perdisci, et al., "Behavioral Clustering of HTTP-Based Malware and Signature Generation Using Malicious Network Traces", In Proceedings of the 7th USENIX Conference on Networked Systems Design and Implementation, Apr. 2010, 14 pages.

Tamersoy, et al., "Guilt by Association: Large Scale Malware Detection by Mining File-relation Graphs", In Proceedings of the 20th ACM SIGKDD International Conference on Knowledge Discovery and Data Mining, Aug. 24, 2014, 10 pages.

Jin, et al., "Binary Function Clustering using Semantic Hashes", In Proceedings of 11th International Conference on Machine Learning and Applications, Dec. 12, 2012, 6 pages.

Jang, et al., "BitShred: Feature Hashing Malware for Scalable Triage and Semantic Analysis", In Proceedings of the 18th ACM Conference on Computer and Communications Security, Oct. 17, 2011, 12 pages.

Jang, Jiyong, "Scaling Software Security Analysis to Millions of Malicious Programs and Billions of Lines of Code", In Doctor of Philosophy, Electrical and Computer Engineering, Aug. 2013, 177 pages.

Liao, et al., "Use of K-Nearest Neighbor Classifier for Intrusion Detection", In Proceedings of Computers & Security, vol. 21, Issue 5, Oct. 1, 2002, 10 pages.

* cited by examiner

LARGE SCALE MALICIOUS PROCESS DETECTION

BACKGROUND

Background and Relevant Art

The goal of secure computer networks is to prevent intrusions from attackers. Modern computer networks include a host of defensive hardware systems and tools such as Security Information and Event Management Systems (SIEMS), hardware and software firewalls, and anti-virus systems. In some cases, clever attackers are able to circumvent security features and obtain access to the network. Once on the network, the attacker uses lateral movement techniques to reach and explore nearby accounts and computers.

Detecting intrusions and attacker activity is extremely challenging due to huge amounts of processes run on each computer, sparsity of event logging, and minuscule number of positive examples of malicious lateral network movement. In most cases, network analysts are extremely fortunate to detect a handful of successful attacks. In this scenario, the standard method of training a classifier to detect lateral movement is not feasible given the dearth of positive training examples.

Advanced persistent threats (APTs) are attackers who are able to gain access to an organization's network and establish multiple redundant communication channels allowing the attacker to remain on the network even when network analysts discover and disable compromised computers and accounts.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is a system which includes one or more computer processors. The system further is associated with a command interface configured to receive user commands for execution by at least one of the one or more computer processors. The system further includes one or more computer readable media coupled to the one or more processors. The one or more computer readable media may include computer executable instructions that when executed by one or more of the one or more computer processors cause a method to be performed. The method includes obtaining a known set or session of processes (such as a set or session of processes that are known to be malicious), wherein the known set or session of processes has certain characteristics. The method further includes obtaining a set or session of processes to be evaluated to determine if the set or session of processes to be evaluated has the certain characteristics. The method 400 may further include performing a weighted similarity measure between the known set or session of processes and the set or session of processes to be evaluated. The weighted similarity measure is performed element wise, where a comparison is performed for each defined element in the set or session of processes to be evaluated against elements in the known set or session of processes and where elements in the known set or session of processes have different weights and where the similarity measure is dependent both on matching elements in the set or session of processes to be evaluated with elements in the known set or session of processes and the weight(s) of any elements in the known set or session of processes that match elements in the set or session of processes to be evaluated.

Another embodiment includes a system for filtering sets or sessions of processes. The system includes one or more computer processors. The system is associated with a command interface configured to receive user commands for execution by at least one of the one or more computer processors. The system further includes one or more computer readable media coupled to the one or more processors. The one or more computer readable media include computer executable instructions that when executed by one or more of the one or more computer processors cause a method to be performed. The method includes obtaining a set or session of processes to be evaluated to determine if the set or session of processes to be evaluated has the certain characteristics. The method further includes obtaining a MinHash vector for a known set or session of processes. The method further includes computing a MinHash vector from the set or session of processes to be evaluated. The method 500 further includes determining whether or not the MinHash vector for the set or session of processes to be evaluated meets a predetermined threshold criteria with respect to the MinHash vector for the known set or session of processes. The method 500 further includes filtering the set or session of processes to be evaluated based on the threshold determination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
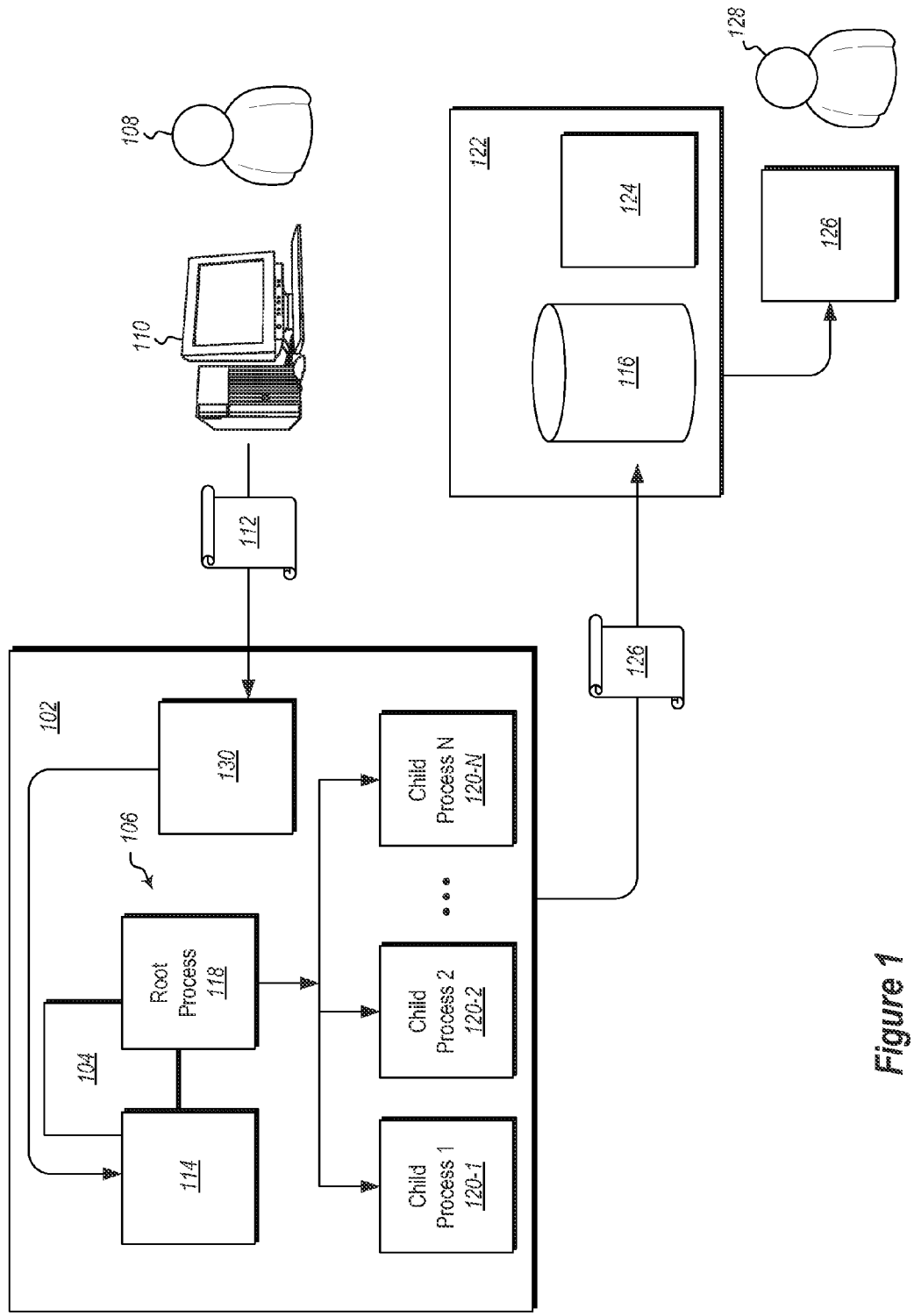
FIG. 1 illustrates a system for evaluating a set or session of processes.

Typically, an individual attacker, or a small group of conspiring attackers, use similar methods and tools to successfully move on a network. These tools may be included in the operating system or implemented by the attacker and copied from a remote computer under the attacker's control (i.e. dropped) to the network under attack. Network intruders typically use the same tools to attack different networks repeatedly. Sometimes, the same network might be attacked twice using the same method. To avoid rule-based detection, the dropped executable files may be renamed slightly to avoid detection by rule-based detection systems. The process names and/or associated parameters executed by the attacker, therefore, tend to be similar. However, nefarious processes are very rare in an overall large datastream. Embodiments herein implement systems and methods to find process names and/or associated parameters that are similar to a known malicious dataset in a large dataset of a captured datastream. In particular, embodiments can be used to identify a small signal in so-called big data (i.e. large datasets of sufficient size and/or complexity that traditional data processing techniques are inadequate). This is akin to finding the proverbial needle in a haystack.

Finding signals in so-called big data is an area of research that is currently new, chaotic, and without well-defined indications of what methods will find signal versus what methods will result in noise overload. Thus, it is incredibly difficult to actually get high signal/noise ratio with large data sets. Embodiment described herein can solve this problem.

Once an individual attacker is discovered, embodiments can use this data to find common attack patterns on the network. In this work embodiments focus on leveraging data collected from previously detected attacks to combat advanced persistent threats (APTs). Embodiments can make use of the fact that attackers are forced to use a common set of tools to explore the network which are rarely used by legitimate users. If they need to drop additional files on the network being attacked, these are even rarer and will stand out. Based on a sequence of processes, which is referred to herein as a ProcessTrace, collected for each user and machine instance, embodiments start with a very small set of malicious seeds and search for similar process sequences which are also instigated by attackers. Once discovered, these can be provided to network analysts for further action.

One example system finds similar attacks based on the Jaccard Index (i.e. Jaccard similarity). However, computing the Jaccard Index with a linear scan is extremely inefficient. Therefore, embodiments may use the MinHash algorithm to efficiently process and filter out a large number of process sequences in a ProcessTrace which do not need to be considered. After this filtering operation, the results of the MinHash algorithm can be used to estimate an unweighted Jaccard Index. Alternatively, an exact Jaccard Index, or some other similarity metric, can be computed on remaining process sequences that are not filtered out. Other similarity metrics that may be computed instead of the Jaccard Index may include one or more of a cosine distance, learned distance, or other metric.

By identifying malicious processes, future similar processes can be blocked, or at least the avenues used to run the process can be blocked. This can help to increase machine efficiency and make systems more performant, as well as increasing system security by eliminating malicious processes that consume resources and compromise data.

Embodiment systems described herein are described in the context of the Windows operating system from Microsoft Corporation of Redmond, Wash. However, it should be appreciated that the principles are universal and can be applied to various environments and operating systems. Thus, it should appreciated that the system can be run on any computer operating system including Linux, MacOs, ChromeOS, or mobile operating system including WindowsPhone. Android, IOS, etc.

FIG. 1 illustrates a computing system 102. The computing system 102 includes one or more processors 104. The processors 104 execute various threads which execute sessions of processes. FIG. 1 illustrates a set 106 of processes executed by a thread of the processor 104.

The raw input to the system is a stream of user commands obtained through a command interface, such as for example from a user entering commands at a terminal, a script executing individual commands or another command generating entity generating commands into the command interface. The stream of user commands includes process names (e.g. net use) and in some cases the parameters (e.g. net use *\\foo\bar).

In one example, FIG. 1 further illustrates a user 108 at a terminal 110 which may be part of the system 102 (e.g. when the user is a nefarious employee or vendor) or external to the system 102, but communicatively coupled to the system 102 (e.g. when a nefarious user has hacked into the system 102). The user 108, in this case is a malicious user who has either obtained access to a terminal 110 of the system 102 or uses the terminal 110 to obtained hacked access into the system. The user 108 sends user commands 112 to the system 102 that are processed by the processor(s) 104 to produce the set 106 of processes. While a human user is illustrated, it should be appreciated that the user 108 could be a script or other command executing or generating entity and that the terminal 110 is not a necessary part of the command interface.

Figure 3:
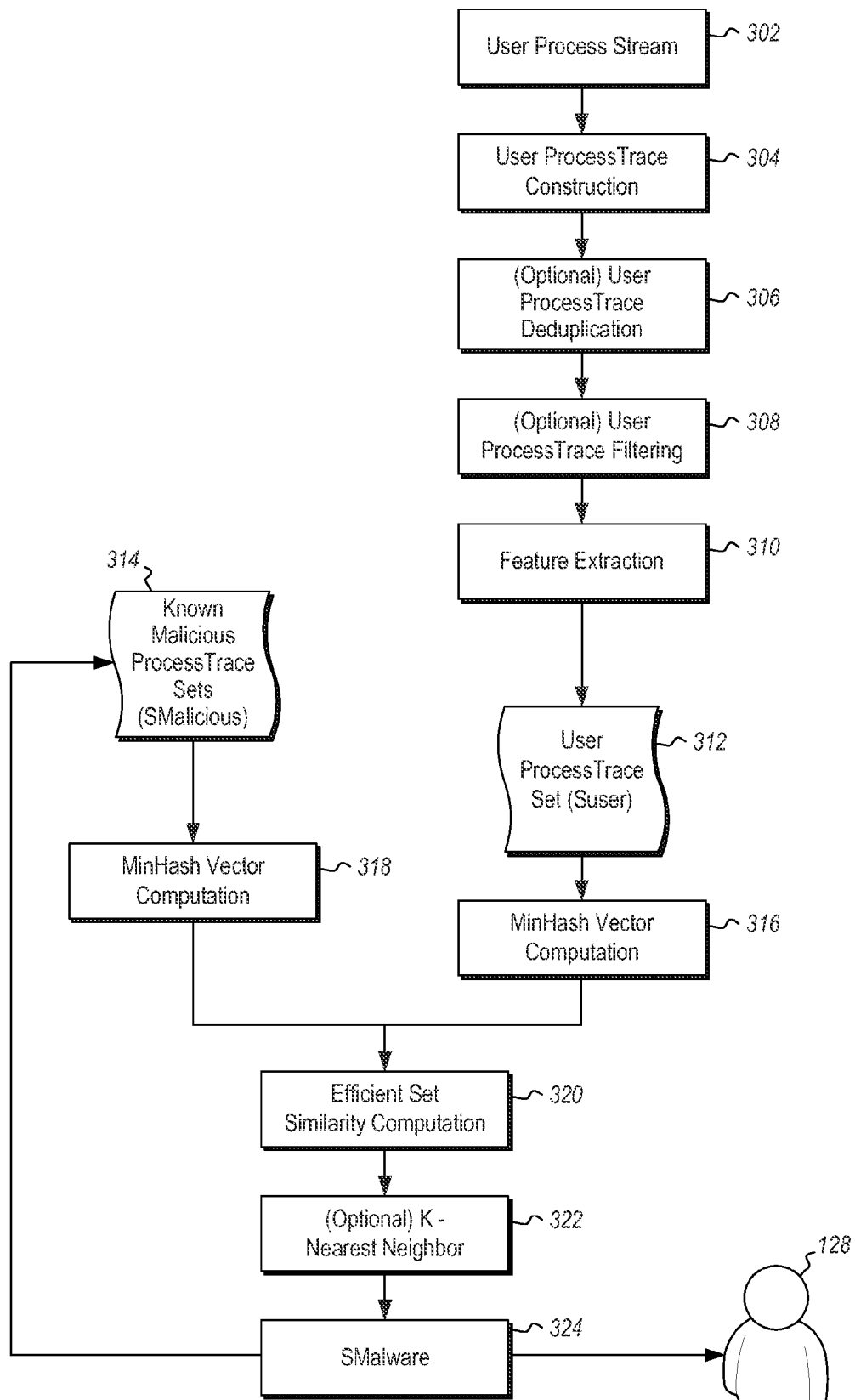
FIG. 3 illustrates a flow for evaluating a set or session of processes.

Reference is now made to FIG. 3 which illustrates various steps that may be performed. As illustrated at 302 and 304, a process stream 302 with process names and arguments can be captured directly from the terminal 110 (which in most, but not all cases, is remotely connected), such as by capturing keyboard keystrokes by the underlying operating system 114 or stored in a log files and later processed. In the first case, the system can be run in real-time, such as a component of an operating system 114. In the latter case, the system can be run either in a near, real-time or in an off-line batch processing mode. Typically in such cases, the processes have been securely recorded and stored in log files 116 which are not located on the computer system 102 that is being monitored.

A ProcessTrace is composed of a set of identifiers, each identifier representing a set of related process, for example but not limited to a set of descendants (direct or indirect) of a common parent process. In embodiments, the parameters and/or arguments for a process may be included in the ProcessTrace. The ProcessTrace may, in implementations, capture the notion of a user session, described in more detail below. In embodiments, the actual data for a ProcessTrace's user session may be a collection of strings corresponding to the commands and parameters run during that user session. As an example:

| User1 cmd.exe; c:\windows\system32\ipconfig /all; c:\Users\user1\foo.exe - params |
|---|

Figure 2:
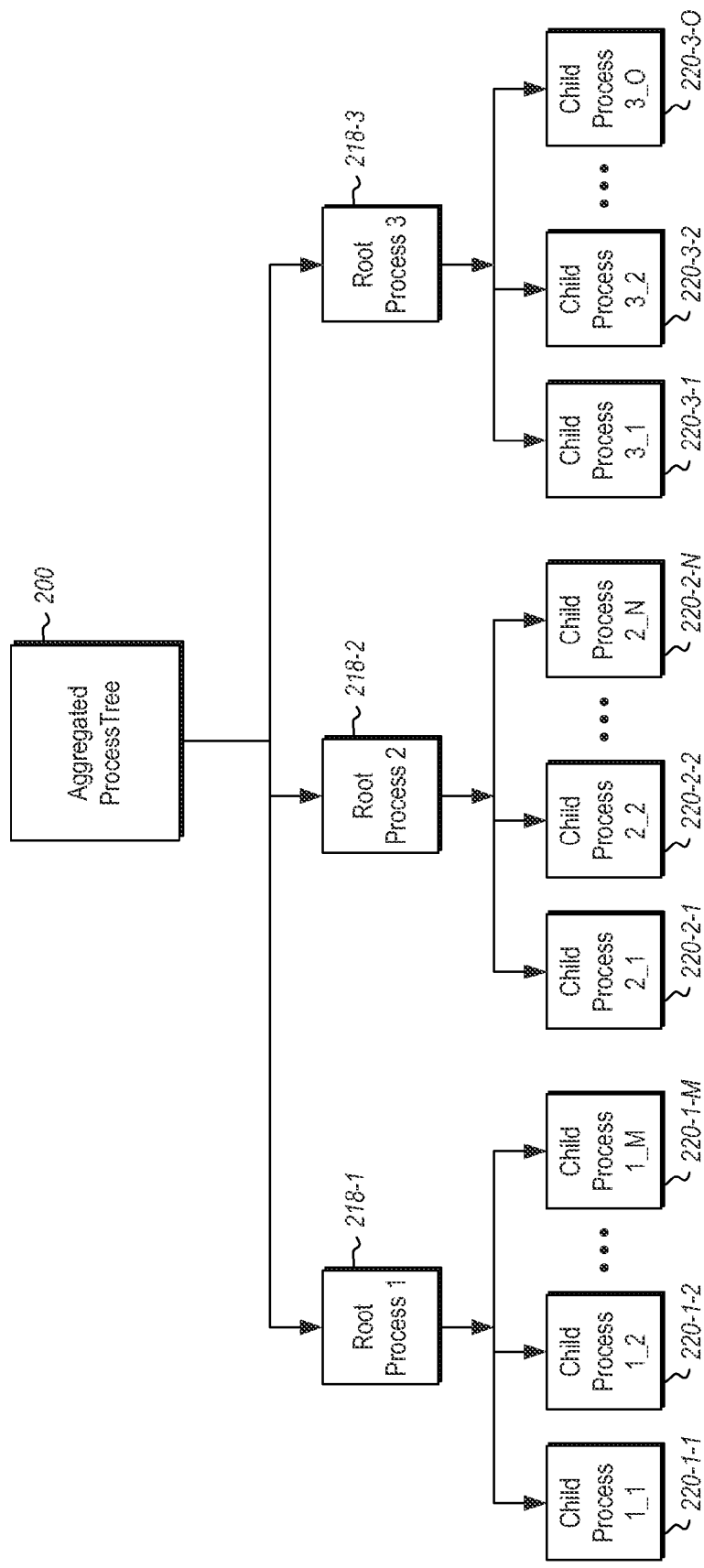
FIG. 2 illustrates a tree with processes from multiple root processes.

For a unique user/machine tuple, processes can be analyzed individually, but this can lead to noisy measurements. Instead, processes can be grouped into a user session which can lead to better performance. As used herein, the term "user session" refers to an aggregation of processes that each share the same parent process, either directly or indirectly, through a process tree, where a process tree is the tree formed by a root process, its child processes which it spawns and then recursively any descendants. Several different methods can be used to aggregate a user's processes. For example, for each time period such as hourly, daily or weekly, a set of processes corresponding to each user is aggregated. These processes can be aggregated for each individual computer system or across multiple computer systems. In one example implementation, embodiments consider a ProcessTrace corresponding to a unique user and a unique computer system. In one method, all processes within a process tree can be aggregated where a process tree is formed when a root process, such as a Windows™ command shell (cmd.exe), is utilized by the user to run commands on the computer. For the examples illustrated herein, embodiments assume that the root process is a Windows™ command shell, but it should be appreciated that other root processes that allow a user to input operating system commands or run operating system executables such as powershell, cygwin bourne shells, etc. can be used. Thus, in this case, in embodiments the ProcessTrace becomes the aggregation, usually in time, of all commands input to that command shell. FIG. 1 illustrates an example where a ProcessTrace collects data for a single root process 118 and corresponding child processes 120-1, 120-2 through 120-N. In another case illustrated in FIG. 2, an aggregated process tree 200 is illustrated with child processes 202-1-1, 220-1-2 through 220-1-M; 220-2-1, 220-2-2, through 220-2-N; 220-3-1, 220-3-2, through 220-3-0 from multiple root processes 218-1, 218-2 and 218-3 respectively can be aggregated for each unique combination of user and machine. This has the benefit that if an attacker tries to hide by running a single command within each high-level, root process, they can be aggregated to reveal the true intent of the attacker.

After constructing the raw ProcessTrace, as illustrated at 306, a processing system 122 (see FIG. 1) can optionally de-duplicate the raw ProcessTrace data. In many cases, ProcessTraces are not unique. In fact, on large scale measurements, real world analysis has shown that approximately only one sixth of the processes found in a process tree are distinct. Since evaluating each ProcessTrace requires computational and, potentially, storage resources, an initial step of de-duplicating the ProcessTrace can lead to significant reductions in both computational and storage resources. During deduplication, a dictionary 124 (see FIG. 1) which maps a ProcessTrace to a set of user/machine identifiers is maintained. After a given ProcessTrace is determined to correspond to malicious behavior, this allows the system to identify all user/machine combinations which exhibit that malicious behavior, and not just the first one detected for that period of time that was identified in the deduplication step.

In some cases, as illustrated at 308 in FIG. 3, an optional filtering stage can be performed. The purpose of the filtering step is to remove any ProcessTraces which are known to be valid. In other cases, a rule-based detection may be run prior to running this similarity-based system or in parallel. In that case, detections based on the rule-based system may be filtered from the input stream to only present unknown results 126 to an analyst 128. As can be appreciated, the processing power required for the filtering process may be reduced by the deduplication of the ProcessTraces illustrated at 306 above. Similarly, the filtering may further reduce processing requirements, by removing benign ProcessTraces, for later stages. These can reduce power consumption, speed processing, or reduce latency in discovering ProcessTraces for further investigation. Additionally, this may remove known benign traces for investigation by the analysts to reduce workload on the analysts.

From the optionally filtered set of remaining strings in the ProcessTrace, embodiments can be configured to extract elements, as illustrated at 310 that would form the new set to which each collection maps. Various different feature extractors could be implemented. Two particular feature exactors are illustrated below, namely a tokenizer and use of Ngrams.

In the tokenizer example, each string in the input collection is split on a set of delimiters and whitespace. The union of the result forms the new set. For example, the process trace "cmd.exe; c:\windows\system32\ipconfig/all; c:\Users\user1\foo.exe-params" might be split into the following set of elements: cmd.exe, c:, windows, system32, ipconfig, /all, c:, Users, user1, foo.exe, -params.

In the Ngrams example, Ngrams are moving window sequences of length n characters are picked from each string in the input collection. For example, embodiments might use trigrams. A partial list of the set of elements for the above process trace might be: cmd, md., d.e, .ex, exe, c:, c:\, :\w, etc.

After feature extraction, the new dataset (illustrated in the present example as SUser) 312 includes a collection of sets with each of the sets having the extracted elements as its members. As shown in FIG. 3, once a ProcessTrace is determined to be malicious, it is added to a collection (illustrated herein as SMalicious) 314. Both of these datasets 312 and 314 can be thought of as a collection of sets. Embodiments can then compute the similarity of a set in SUser and SMalicious as illustrated at 320.

Embodiments define a similarity score between two sets. Embodiments may be configured to find the set in SMalicious for which this similarity score is maximized for a set in SUser. A naïve method would take a cross product of these two collections and then compute the similarity score for each pair. However, this may not feasible in certain embodiments depending on the size of the input dataset. In such embodiments, embodiments resort to probabilistic techniques to filter the candidate pairs on which embodiments would compute a score.

The MinHash algorithm is an existing randomized hashing technique to compute, or at least approximate, a Jaccard Index between two sets. Each member of the set is hashed using a hashing function and the minimum hash value (called the MinHash) is computed over the set. Thus, for example, each of the elements in the set "cmd.exe, c:, windows, system32, ipconfig. a, c:, Users, user1, foo.exy, -params" is hashed, and the smallest hash value computed represents the entire set. A MinHash vector includes several minimum hash values for the same set computed with a different hashing algorithm for each element in the vector. Thus, for example, a MinHash vector with a length of 10 is formed by computing 10 minimum hash values for the same set of data, each element being computed with one of 10 different hashing algorithms. While completely different computation methods may be used for the different hashing algorithms, more commonly the different hashing algorithms involve the same computational process, but with different seed values.

Embodiments may use the Jenkins hash, the Murmur 3 hash, Murmur 2 hash, or other appropriate hash. As noted above, for a MinHash vector of length N, the hashing process is repeated (using different hashing functions for each element, i.e. completely different algorithms or algorithms with different seeds) N times for one set (e.g. set 312) to create a first MinHash vector of length N (i.e. having N minimum hash values). The hashing process is also repeated N times over the other set (e.g. set 314), using the same algorithms per element as the first set, to create a second MinHash vector of length N. The first and second MinHash vectors are compared element wise with n being the number of ordered elements in the MinHash vector that match between the two MinHash vectors. An approximation of the Jaccard Index is given by n/N.

For example, assume a set A and a set B and follows:
A={dog, cat, ate, the}
B={dog, ran, the, away}
Further assume that the MinHash vectors of length N=6 for these two sets are:
minHash vector set A: 09,31,05,02,01,52
minHash vector set B: 09,03,08,02,05,51

Each of the elements in the vector is calculated using a hashing function. Assume the hashing functions are $H_1$, $H_2$, $H_3$, $H_4$, $H_5$, and $H_6$. Thus, in the example illustrated when $H_1$ is applied to each element in set A (i.e. hashing "dog" with $H_1$, hashing "cat" with $H_1$, hashing "ate" with $H_1$ and hashing "the" with $H_1$) and the minimum of those hashes is identified, the first element of the MinHash vector for set A is calculated and identified as "09". The second element "31" is calculated and identified by applying $H_2$ in the same way to set A. This process is repeated for each of the element with the corresponding hash function to create the MinHash vector. The same process is performed on the set B to produce a MinHash vector for set B. Namely, the first element "09" is calculated and identified by applying $H_1$ to each of the elements in set B and identifying the minimum calculated hash, the second element "03" is calculated and identified by applying $H_2$ to each of the elements in set B and identifying the minimum calculated hash, the third element "08" is calculated and identified by applying $H_3$ to each of the elements in set B and identifying the minimum calculated hash, the fourth element "02" is calculated and identified by applying $H_4$ to each of the elements in set B and identifying the minimum calculated hash, the fifth element "05" is calculated and identified by applying $H_5$ to each of the elements in set B and identifying the minimum calculated hash, and the sixth element "51" is calculated and identified by applying $H_6$ to each of the elements in set B and identifying the minimum calculated hash. Each of the corresponding elements is compared in the MinHash vectors. Thus, "09" is compared to "09", "31" is compared to "03", "05" is compared to "08", "02" is compared to "02", "01" is compared to "05", and "52" is compared to "51". Two of these comparisons match, i.e. 09 and 02, and therefore, n=2. Thus, the estimated Jaccard Index is 2/6, where n=2 and N=6. More formally and generically, the estimated unweighted Jaccard index is:

$$EJ(A, B) = \frac{\sum_{i=1}^{n} I(h\min i(A) = h\min i(B))}{n}$$

The actual non-estimated unweighted Jaccard Index is computed as:

$$J(A, B) = \frac{|A \cap B|}{|A \cup B|}$$

Which in the illustrated example is:

$$J(A, B) = \frac{|\{dog, the\}|}{|\{dog, the, cat, ate, away, ran\}|} = \frac{2}{6} \approx 0.33$$

In this particular case, the estimated Jaccard Index and the Jaccard Index are exactly the same.

To adjust the occurrence of false positives and negatives, and to reduce the number of comparisons needed, typically the MinHashes are concatenated for a number that is known as the band size. In particular, different MinHash elements in a given vector are concatenated. The same element wise concatenations are performed for each of the MinHash vectors. The concatenations are then compared instead of individual MinHashes. Thus for the example above, a band side of two would produce the concatenated Minhash vectors as follows:
Concatenated minHash vector set A: 0931,0502,0152
Concatenated minHash vector set B: 0903,0802,0551

In this case, there are no matching elements, and thus the estimated Jaccard index is 0. Thus, by increasing the band size, the accuracy has been reduced.

Selection of vector length and band size may be based on computing resources available. If an unlimited amount of computing resources are available, one might choose to have a very large vector length N, such as somewhere between 500 and 2,000 elements and a small band size, such as 1. However, many current computing systems may be sufficiently accurate with a vector length N=10 and a band size of 1. The small MinHash vector length improves the computational efficiency and the small band size reduces the chance of false negatives.

The MinHash vector comparison described above can be used as a filter used before doing more expensive set similarity computations (such as exact unweighted or weighted Jaccard Index computations, a cosine distance computation, a learned distance computation, or some other metric). In particular, set pairs that do not have an intersection, would have a zero score in similarity using the MinHash vector comparison, and thus could be filtered out such that exact similarities do not need to be computed. When embodiments obtain pairs that had a match in at least one (or some other predetermined threshold) MinHash, then, embodiments use these pairs for an exact set intersection. Thus, after the MinHash filtering, embodiments can then compute an exact similarity on remaining sets.

In some embodiments, weighting is performed as part of the expensive set similarity computation. In particular, some embodiments compute the inverse document frequency (IDF) weight of each member of the each set 312, which in the illustrated embodiment, is equal to the inverse of its frequency of occurrence. Then embodiments take the ratio of the weight of the members of the intersection divided by the sum of the weights of the members of the set in SMalware (B) that the set is being compared against. More formally, the IDF weight for set item i is:

$$w_i = \frac{1.0}{N_c(i)}$$

where $N_c(i)$ represents the number of times item i occurs in the corpus of sets. An alternative IDF weighting value is:

$$w_i = \log\left(\frac{1.0}{N_c(i)}\right)$$

The weighted similarity score between sets A and B with inverse document weights can then be computed as:

$$\text{Score}(A, B) = \frac{\sum_{i \in A \cap B} w_i}{\sum_{i \in B} w_i}$$

In another implementation using term frequency, inverse document frequency (TFIDF) weighting. For TFIDF weighting, the number of times the item (i.e. token or ngram) occurs in the set is also considered. Unlike the IDF weights, the TFIDF weights vary for each item in each set:

$$w_{xi} = N_x(i)\log\left(\frac{1.0}{N_c(i)}\right)$$

where $N_x(i)$ represents the number of times item i occurs in set x. Since weights vary for each set, the weighting similarity score between sets A and B using TFIDF weights is:

$$\text{Score}(A, B) = \frac{\sum_{i \in A \cap B} \text{Min}(w_{Ai}, w_{Bi})}{\sum_{i \in A \cup B} \text{Max}(w_{Ai}, w_{Bi})}$$

The weighted similarity score is more precise than embodiments that do not use a weighted score. In other words, it ranks ProcessTraces which are more likely to be similar to those used by the attacker. However, embodiments implementing an unweighted version of the system reduces to the standard Jaccard Index computation.

$$\text{Score}(A, B) = \frac{|A \cap B|}{|A \cup B|}$$

The two methods produce different results, and both may be important in different scenarios. For example, the weighted approach is important for detecting potentially malicious ProcessTraces, while the unweighted approach is often more useful for exploration of flagged ProcessTraces by an analyst 128 to determine if they contain malicious elements.

Additionally, in some embodiments, care should be taken when using weights to ensure that a ProcessTrace contains standard executables, i.e. common processes. Otherwise the weighting will tend to degenerate to being equivalent to a plain text data search for the uncommon process.

Finally, for every set in SUser 312, embodiments output the set in SMalware 324 that produces the highest score and output the pair and the suspicious score SS.

$$\text{SS}(a, b)_{a \in A, b \in B} = \underset{b \in B}{\text{argmax}}\, \text{Score}(a, b)$$

This output 324 can eventually be provided to an analyst 128.

Embodiments may alternatively or additionally implement a scoring scheme that can integrate scores from matches to different sets.

Some embodiments compute set similarity scores for the tuple pairs and order them in a decreasing order by the similarity score. After employing weights scores cease to be 1.0 for high similarity. Ideally, the scores will be biased towards 1.0 if there is high similarity with a malicious set and towards 0.0 if there is less similarity. Two approaches to fix this are (1) normalizing the score, and (2) normalizing the weights.

There are multiple methods to rank the similarity results for analysts. The first method is based only on returning ProcessTrace results with a threshold of the (weighted) Jaccard Index from the attacker's ProcessTrace. The second method is to return the top K results for each ProcessTrace in a malicious ProcessTrace collection. This second method is commonly referred to as the (weighted) K-Nearest Neighbor method and is illustrated at 322 in FIG. 3. The first method may be preferable for operational deployment because it only notifies analysts based on a high probability of attack, depending on the selected distance threshold. The second method is preferable for analysts who want to explore potential new attacks which are not highly likely to be related to the known attacks, but may be new, similar attacks that are below the threshold of the first method that is used to raise an alert.

In some cases, it may require a significant amount of historical data to discover a sophisticated attacker on the network. On a cloud infrastructure, it is much faster to write scripts that maintain internal data streams locally instead of writing intermediate state to streams on the disk. However, embodiments may include systems which store the intermediate MinHash vectors, and the associated weight vectors in the case of the weighted Jaccard Index, for fast information retrieval. When a new attack is later discovered and added to the malicious set, storing this data allows analysts to quickly search all of the previous historical data and investigate if that attacker had previously used those methods in the past on the network.

Embodiments may be performed by various different components. For example in some embodiments, a system first collects the logs and then runs the process offline. For example, the system 122 may collect process logs from the system 102 and store them in the log files 116. The system 122 can then process the logs as illustrated in FIG. 3 when it is convenient for the system 122.

However, other embodiments may perform the processing, such as that illustrated in FIG. 3, in real-time or near real-time on the client operating system. For example, all, or at least a portion of the processing illustrated in FIG. 3 may be performed on the system 102.

In one such example, embodiments continually compute the MinHash vector on the client, such as the system 102. Once the MinHash vector is computed on the client, and then:

1) embodiments can run the MinHash detector in real-time on the client system 102; and/or;

2) upload the MinHash vector 126 to a backend system 122 for offline monitoring, detection, and forensics.

In the first step, the malicious set 314 is downloaded to the client computer system 102 much like antivirus signatures are stored and used during detection by the antivirus engine. However, this system differs from antivirus signatures in that antivirus signatures are for identifying files and applications, whereas this present system includes signatures for commands calling processes. A second option is to collect the MinHash vectors, and their associated term-frequency weights for a weighted Jaccard index, and transmit them to the backend system 122 for detection. While the first method is very fast, it allows the attackers to test the malicious set on the client and to modify their attacks to circumvent detection. It can possibly be used to block the access of critical resources however. The second method allows the backend to maintain the malicious set hidden from the attackers. Upon detection of a possible attack on the backend, an alert can be generated and transmitted to security administrators responsible for maintaining the security of the network.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
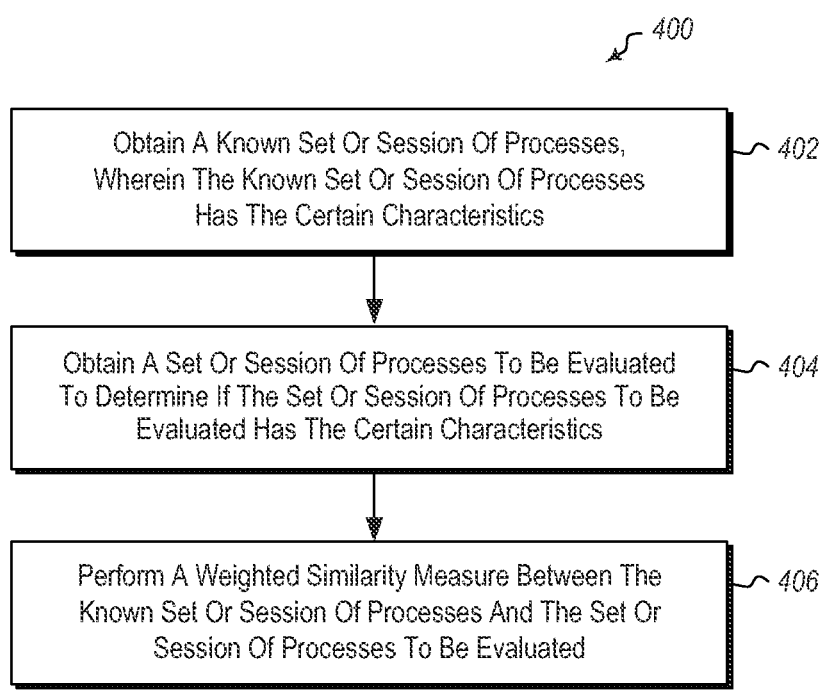
FIG. 4 illustrates a method of identifying a set or session of processes as having certain characteristics.

Referring now to FIG. 4, a method 400 is illustrated. The method 400 may be practiced by a computing system configured to identify a set or session of processes as having certain characteristics. For example, the set or session of processes may contain elements that are similar to those used in malicious attacks. The system on which the method is practiced may include one or more computer processors. For example, FIG. 1 illustrates a system 102 that includes one or more processors 104. However, in an alternative system, the system may be an overall system, such as one that includes the system 102 and the system 122 each of which includes processors that are included in the set of one or more processors. Embodiments may be associated with a command interface configured to receive user commands coupled for execution by one or more computer processors. In the example shown in FIG. 1, this is done by including an interface 130 that is configured to receive commands for the operating system 114 which can then execute the commands on the processor(s) 104. Note that in some embodiments, the command interface may include both the interface 130 and the terminal 110 when the terminal is included as part of the overall system. However, the interface 103 may be sufficient to be used as a command interface. This may be particularly true when the command interface receives user commands as a result of an executing script or other command generating entity without a human user needing to enter commands. Note further that as used herein, executing commands may include traditional execution of explicit instructions and/or interpretation of various user commands. The system on which the method is executed may further include one or more computer readable media coupled to the one or more processors. The one or more computer readable media may include computer executable instructions that when executed by one or more of the one or more computer processors cause the method to be performed. The computer readable media may be distributed between various parts of the overall system or implemented in a single location.

The method 400 includes obtaining a known set or session of processes, wherein the known set or session of processes has certain characteristics (act 402). For example, in the examples illustrated above, the known set or session of processes is the set 314 which is known to have malicious elements.

The method 400 further includes obtaining a set or session of processes to be evaluated to determine if the set or session of processes to be evaluated has the certain characteristics (act 404). For example, the system 102 may be able to capture commands at the interface 130 that are input to the system 102. These captured commands can be those provided. Such commands may be input using a terminal 110 or some other root process interface, such as in Windows™ a command shell.

The method 400 may further include performing a weighted similarity measure between the known set or session of processes and the set or session of processes to be evaluated (act 406). The weighted similarity measure is performed element wise, where a comparison is performed for each defined element in the set or session of processes to be evaluated against elements in the known set or session of processes and where elements in the known set or session of processes have different weights and where the similarity measure is dependent both on matching elements in the set or session of processes to be evaluated with elements in the known set or session of processes and the weight(s) of any elements in the known set or session of processes that match elements in the set or session of processes to be evaluated.

The method 400 may be performed where performing a weighted similarity measure comprises performing a weighted Jaccard similarity measure.

The method 400 may be performed where performing a weighted similarity measure comprises performing a weighted similarity measure where weighting is based on term frequency which identifies the frequency of given element values in the set or session of processes to be evaluated.

The method 400 may be performed where performing a weighted similarity measure comprises performing a weighted similarity measure where weighting is based on inverse document frequency which identifies the frequency of given element values in the known set or session of processes.

Some embodiments of the method 400 may combine both inverse document frequency weighting and term frequency weighting.

The method 400 may be performed where the elements are discrete arguments or commands. For example as illustrated above, the elements in the process trace "cmd.exe; c:\windows\system32\pconfig/all;   c:\Users\user1\foo.exe-params" might be the following set of elements: cmd.exe, c:, windows, system32, ipconfig, /all, c:, Users, user1, foo.exy, -params.

The method 400 may be performed where the elements are Ngrams. For example as illustrated above, for a trigram, the elements in the process trace "cmd.exe; c:\windows\system32\pconfig/all;   c:\Users\user1\foo.exe-params" might be cmd, md., d.e, .ex, exe, c:, c:\, :\w, . . . etc.

Figure 5:
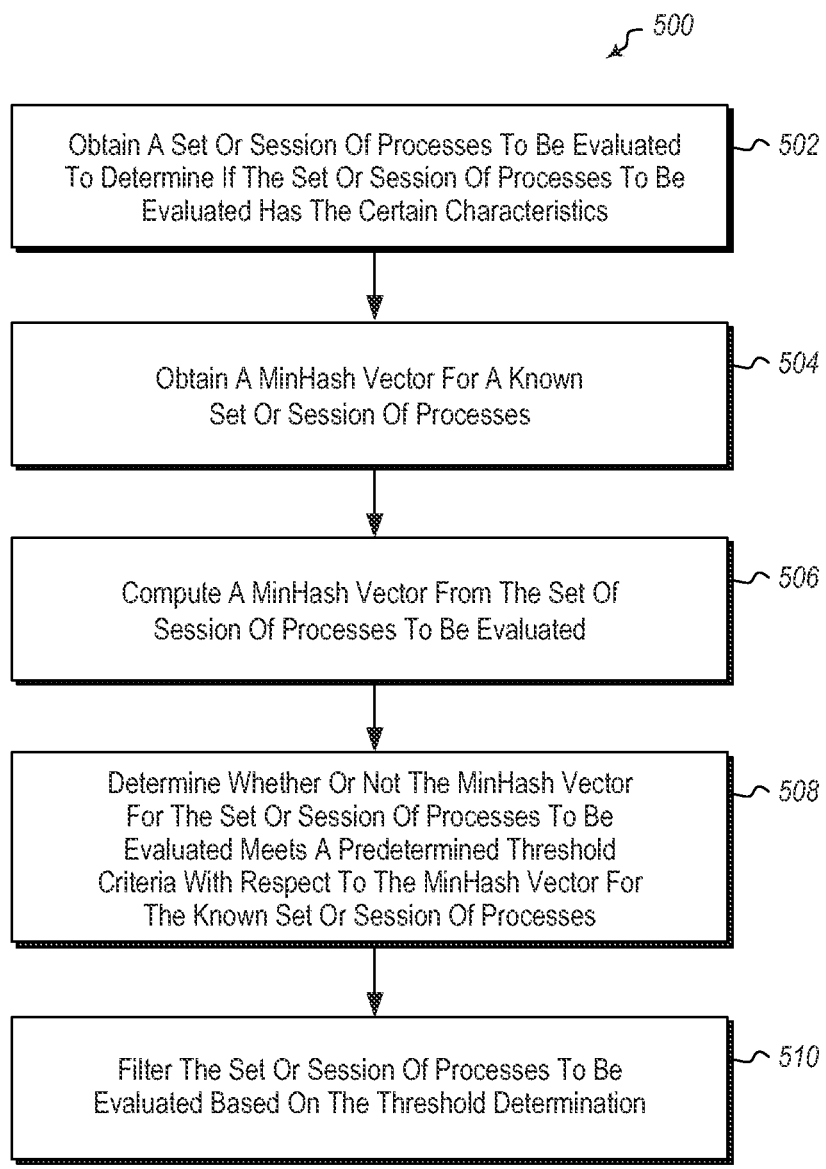
FIG. 5 illustrates a method of filtering sets or sessions of processes.

Referring now to FIG. 5, a method 500 is illustrated. In a computing environment, a method of filtering sets or sessions of processes, the method comprising:

The system on which the method is practiced may include one or more computer processors. For example, FIG. 1 illustrates a system 102 that includes one or more processors 104. However, in an alternative system, the system may be an overall system, such as one that includes the system 102 and the system 122 each of which include processors that are included in the one or more processors. The system on which the method is implemented is associated with a command interface configured to receive user commands or execution by one or more computer processors. In the example shown in FIG. 1, this is done by including an interface 130 that is configured to receive commands for the operating system 114 which can then execute the commands on the processor (s) 104. Note that in some embodiments, the command interface may include both the interface 103 and the terminal 110 when the terminal is included as part of the overall system. However, the interface 103 may be sufficient to be used as a command interface. The system on which the method is executed may further include one or more computer readable media coupled to the one or more processors. The one or more computer readable media may include computer executable instructions that when executed by one or more of the one or more computer processors cause the method to be performed. The computer readable media may be distributed between various parts of the overall system or implemented in a single location.

The method 500 includes capturing, from the command interface, a set or session of processes to be evaluated to determine if the set or session of processes to be evaluated has the certain characteristics (act 502).

The method 500 further includes obtaining a MinHash vector for a known set or session of processes (act 504).

The method 500 further includes obtaining a MinHash vector from the set or session of processes to be evaluated (act 506).

The method 500 further includes determining whether or not the MinHash vector for the set or session of processes to be evaluated meets a predetermined threshold criteria with respect to the MinHash vector for the known set or session of processes (act 508).

The method 500 further includes filtering the set or session of processes to be evaluated based on the threshold determination (act 510).

The method 500 may be practiced where hashing to create the MinHash vector for the set or session of processes to be evaluated is performed at a local machine where the set or session of processes to be evaluated were invoked and where obtaining the MinHash vector comprises obtaining the MinHash vector from the local machine. Thus, for example, the MinHash vector may be calculated at the machine 102.

Alternatively, the method 500 may be practiced where hashing to create the MinHash vector for the set or session of processes to be evaluated is performed at a local machine where the set or session of processes to be evaluated were invoked and the MinHash vector for the known set or session of processes is obtained from a central authority and where determining whether or not the MinHash vector for the set or session of processes to be evaluated meets a predetermined threshold criteria with respect to the MinHash vector for the known set or session of processes is performed at the local machine. Thus for example, a MinHash vector may be calculated for a set or session of processes at the machine 102, while the MinHash vector for the known set or session of processes is obtained from the system 122 or some other authority. In particular, a central authority as used herein is a centralized entity that is able to provide data, in this case MinHash vectors for known sets or sessions or processes, to various different entities for evaluation. A central authority could be a company that provides such information to any customer who purchases such information. Alternatively, the central authority may be a repository configured to store and provide such data for distribution, either privately or publically.

The method 500 may further include receiving the set or session of processes to be evaluated from a local machine where the set or session of processes to be evaluated were invoked and from the set or session of processes to be evaluated, computing the MinHash vector for the set or session of processes to be evaluated. For example, the system 122 could compute all of the MinHash vectors.

The method 500 may further include receiving an Ngrams vector based on the set or session of processes to be evaluated from a local machine where the set or session of processes to be evaluated were invoked and from the set or session of processes to be evaluated, computing the MinHash vector for the set or session of processes to be evaluated. This embodiments is particularly useful to maintain privacy and security of the system 102. In particular, the set or session of processes will often contain user names, passwords, or other sensitive information. By creating an Ngrams vector, this information can be obfuscated. Similarly, in the embodiments above where the MinHash is calculated at the local system 102, this information can be obfuscated by hashing.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which Scan be used to store desired program code means in the form of computer-executable instructions or data structures and which can be accessed by a general purpose or special purpose computer. Physical computer-readable storage media excludes media consisting of transitory, propagating signals.

As used herein, "statutory computer-readable media" consists of computer-readable media that is a patentable subject matter under 35 U.S.C. §101.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs). Program-specific Standard Products (ASSPs), System-on-a-chip systems (SOCs). Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method configured to detect and block malicious processes having certain characteristics, the method comprising:

obtaining a known set or session of processes, wherein the known set or session of processes has the certain characteristics;

obtaining a set or session of processes to be evaluated, including a plurality of process trees, captured from a command interface, to determine if the set or session of processes to be evaluated has the certain characteristics;

de-duplicating the set or session of processes to be evaluated to identify duplicate processes from the set or session of processes and to remove duplicate processes from the set or session of processes wherein at least a portion of the duplicate processes from the set or session of processes are not directly measured against the known set or session of processes;

maintaining a dictionary correlating de-duplicated processes to at least one user or machine wherein when a process trace is determined to correspond to malicious behavior, one or more other users or machines can be identified by reference to the dictionary;

after de-duplicating, performing a weighted similarity measure between the known set or session of processes and the de-duplicated set or session of processes to be evaluated, wherein the weighted similarity measure is performed element wise, where a comparison is performed for each defined element in the set or session of processes to be evaluated against elements in the known set or session of processes and where elements in the known set or session of processes have different weights and where the similarity measure is dependent both on matching elements in the set or session of processes to be evaluated with elements in the known set or session of processes and the weights of any elements in the known set or session of processes that match elements in the set or session of processes to be evaluated; and as a result of performing a weighted similar measure between the known set or session of processes and the de-duplicated set or session of processes to be evaluated, blocking at least one process in the set or session of processes from executing at a computing system based on the at least one process being similar to one or more processes in the known set or session of processes.

2. The method of claim 1, wherein performing the weighted similarity measure comprises performing a weighted Jaccard similarity measure.

3. The method of claim 1, wherein performing the weighted similarity measure comprises performing the weighted similarity measure where weighting is based on term frequency which identifies the frequency of given element values in the set or session of processes to be evaluated.

4. The method of claim 1, wherein performing the weighted similarity measure comprises performing the weighted similarity measure where weighting is based on inverse document frequency which identifies the frequency of given element values in the known set or session of processes.

5. The method of claim 1, wherein the elements are discrete arguments or commands.

6. The method of claim 1, wherein the elements are Ngrams.

7. The method of claim 1, further comprising:

obtaining a MinHash vector for the known set or session of processes;

obtaining a MinHash vector for the set or session of processes to be evaluated;

determining whether or not the MinHash vector for the set or session of processes to be evaluated meets a predetermined threshold criteria with respect to the MinHash vector for the known set or session of processes;

filtering the set or session of processes to be evaluated based on the threshold determination; and wherein the weighted similarity measure is performed on the filtered set or session of processes to be evaluated.

8. The method of claim 7, wherein hashing to create the MinHash vector for the set or session of processes to be evaluated is performed at a local machine where the set or session of processes to be evaluated were invoked and wherein obtaining the MinHash vector comprises obtaining the MinHash vector from the local machine.

9. The method of claim 7, wherein hashing to create the MinHash vector for the set or session of processes to be evaluated is performed at a local machine where the set or session of processes to be evaluated were invoked and the MinHash vector for the known set or session of processes is obtained from a central authority and wherein determining whether or not the MinHash vector for the set or session of processes to be evaluated meets a predetermined threshold criteria with respect to the MinHash vector for the known set or session of processes is performed at the local machine.

10. The method of claim 7, further comprising:

receiving the set or session of processes to be evaluated from a local machine where the set or session of processes to be evaluated were invoked; and from the set or session of processes to be evaluated, computing the MinHash vector for the set or session of processes to be evaluated.

11. The method of claim 7, further comprising:

receiving an Ngrams vector based on the set or session of processes to be evaluated from a local machine where the set or session of processes to be evaluated were invoked; and from the set or session of processes to be evaluated, computing the MinHash vector for the set or session of processes to be evaluated.

12. The method of claim 1, wherein the set or session of processes to be evaluated is a particular single user session, wherein the user session is an aggregation of processes that each share the same parent process through a process tree, where the process tree is a tree formed by a root process, its child processes which it spawns and then recursively, any decedents.

13. In a computing environment, a system for detecting and blocking malicious processes, the system comprising:

one or more computer processors;

one or more computer readable media coupled to the one or more processors, the one or more computer readable media comprising computer executable instructions that when executed by the one or more computer processors cause the following to be performed:

obtaining a set or session of processes to be evaluated, including a plurality of process trees, wherein the set or session of processes is captured from a command interface configured to receive user commands for execution by one or more processors, to determine if the set or session of processes to be evaluated has the certain characteristics;

de-duplicating the set or session of processes to be evaluated to identify duplicate processes from the set or session of processes and to remove duplicate processes from the set or session of processes wherein at least a portion of the duplicate processes from the set or session of processes are not directly measured against a known set or session of processes;

maintaining a dictionary correlating de-duplicated processes to at least one user or machine wherein when a process trace is determined to correspond to malicious behavior, one or more other users or machines can be identified by reference to the dictionary;

obtaining a MinHash vector for the known set or session of processes;

obtaining a MinHash vector from the de-duplicated set or session of processes to be evaluated;

determining whether or not the MinHash vector for the de-duplicated set or session of processes to be evaluated meets a predetermined threshold criteria with respect to the MinHash vector for the known set or session of processes; and as a result of determining whether or not the MinHash vector for the de-duplicated set or session of processes to be evaluated meets a predetermined threshold criteria with respect to the MinHash vector for the known set or session of processes, blocking at least one process in the set or session of processes from executing at a computing system based on the at least one process being similar to one or more processes in the known set or session of processes.

14. The system of claim 13, wherein hashing to create the MinHash vector for the set or session of processes to be evaluated is performed at a local machine where the set or session of processes to be evaluated were invoked and wherein obtaining the MinHash vector comprises obtaining the MinHash vector from the local machine.

15. The system of claim 13, wherein hashing to create the MinHash vector for the set or session of processes to be evaluated is performed at a local machine where the set or session of processes to be evaluated were invoked and the MinHash vector for the known set or session of processes is obtained from a central authority and wherein determining whether or not the MinHash vector for the set or session of processes to be evaluated meets a predetermined threshold criteria with respect to the MinHash vector for the known set or session of processes is performed at the local machine.

16. The system of claim 13, the one or more computer readable media further comprising computer executable instructions that when executed by the one or more processors cause the following to be performed:

receiving the set or session of processes to be evaluated from a local machine where the set or session of processes to be evaluated were invoked; and from the set or session of processes to be evaluated, computing the MinHash vector for the set or session of processes to be evaluated.

17. The system of claim 13, the one or more computer readable media further comprising computer executable instructions that when executed by the one or more processors cause the following to be performed:

receiving an Ngrams vector based on the set or session of processes to be evaluated from a local machine where the set or session of processes to be evaluated were invoked; and from the set or session of processes to be evaluated, computing the MinHash vector for the set or session of processes to be evaluated.

18. A computing system configured to detect and block malicious processes having certain characteristics, the system comprising:

one or more computer processors;
one or more computer readable media coupled to the one or more processors, the one or more computer readable media comprising computer executable instructions that when executed by the one or more computer processors cause the following to be performed:
   obtaining a known set or session of processes, wherein the known set or session of processes has the certain characteristics;
   obtaining a set or session of processes to be evaluated, including a plurality of process trees, wherein the set or session of process is captured from a command interface, to determine if the set or session of processes to be evaluated has the certain characteristics;
   de-duplicating the set or session of processes to be evaluated to identify duplicate processes from the set or session of processes and to remove duplicate processes from the set or session of processes wherein at least a portion of the duplicate processes from the set or session of processes are not directly measured against the known set or session of processes;
   maintaining a dictionary correlating de-duplicated processes to at least one user or machine wherein when a process trace is determined to correspond to malicious behavior, one or more other users or machines can be identified by reference to the dictionary;
   after de-duplicating, performing a weighted similarity measure between the known set or session of processes and the de-duplicated set or session of processes to be evaluated, wherein the weighted similarity measure is performed element wise, where a comparison is performed for each defined element in the set or session of processes to be evaluated against elements in the known set or session of processes and where elements in the known set or session of processes have different weights and where the similarity measure is dependent both on matching elements in the set or session of processes to be evaluated with elements in the known set or session of processes and the weights of any elements in the known set or session of processes that match elements in the set or session of processes to be evaluated; and
   as a result of performing a weighted similar measure between the known set or session of processes and the de-duplicated set or session of processes to be evaluated, blocking at least one process in the set or session of processes from executing at a computing system based on the at least one process being similar to one or more processes in the known set or session of processes.

19. The system of claim 18, wherein performing the weighted similarity measure comprises performing the weighted similarity measure where weighting is based on term frequency which identifies the frequency of given element values in the set or session of processes to be evaluated.

20. The system of claim 18, wherein performing the weighted similarity measure comprises performing the weighted similarity measure where weighting is based on inverse document frequency which identifies the frequency of given element values in the known set or session of processes.

21. The system of claim 18, the one or more computer readable media further comprising computer executable instructions that when executed by the one or more processors cause the following to be performed:
   obtaining a MinHash vector for the known set or session of processes;
   obtaining a MinHash vector for the set or session of processes to be evaluated;
   determining whether or not the MinHash vector for the set or session of processes to be evaluated meets a predetermined threshold criteria with respect to the MinHash vector for the known set or session of processes;
   filtering the set or session of processes to be evaluated based on the threshold determination; and
   wherein the weighted similarity measure is performed on the filtered set or session of processes to be evaluated.

* * * * *